Dec. 3, 1935.   L. G. KNAPP   2,022,723
EGG TURNING TRAY
Filed April 3, 1931   2 Sheets-Sheet 2
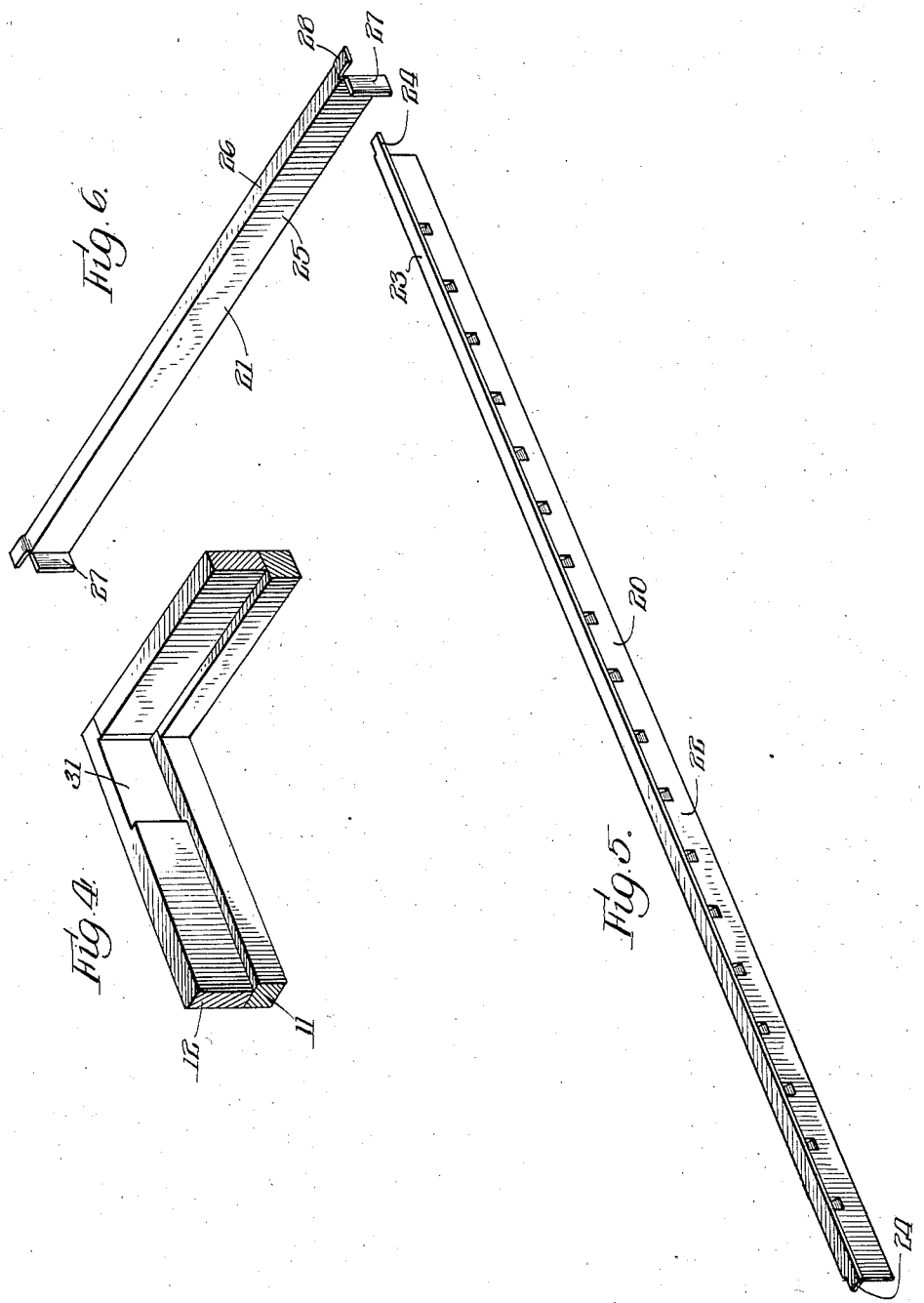
Inventor:
Leland G. Knapp Patented Dec. 3, 1935

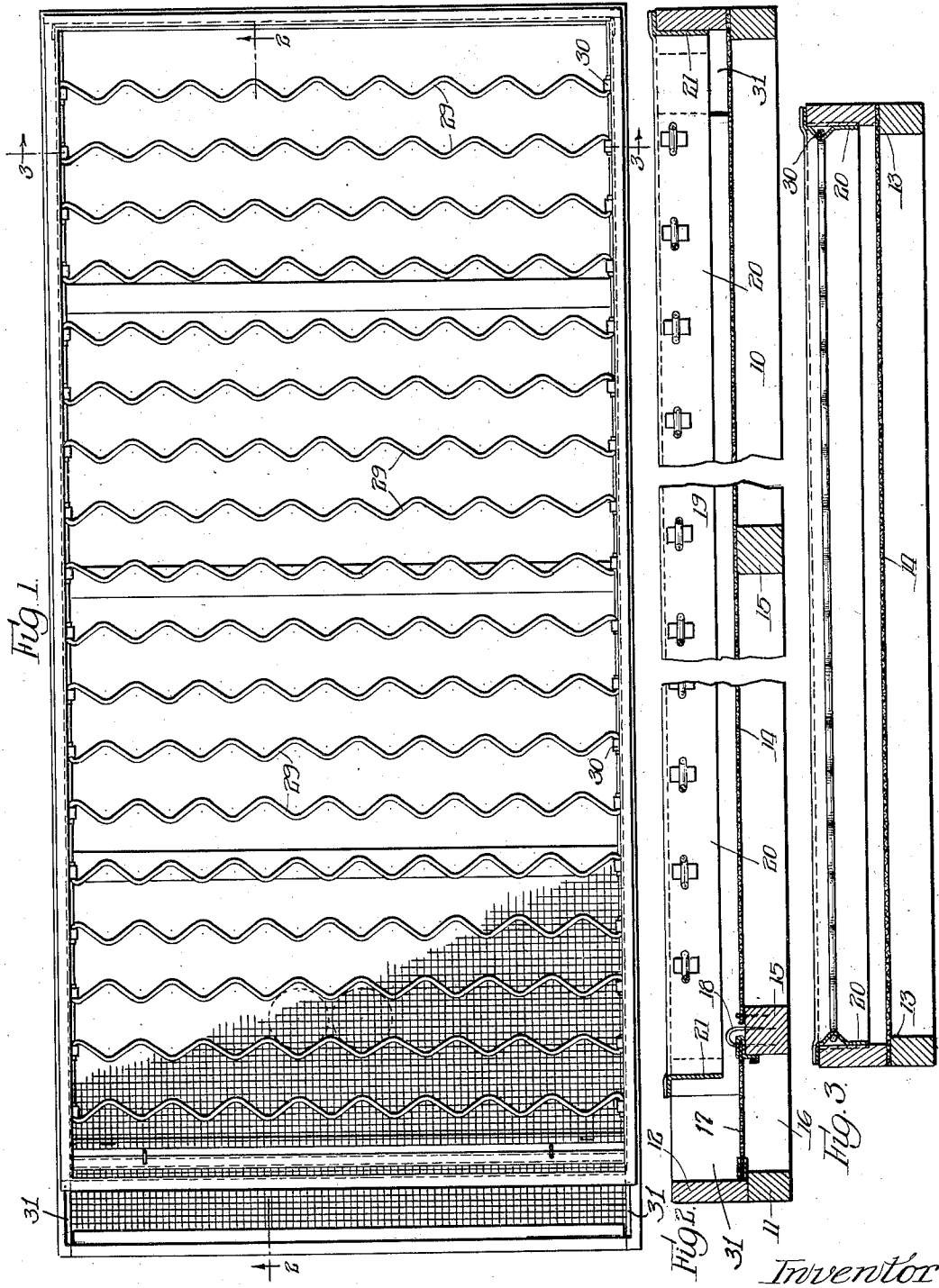

2,022,723

UNITED STATES PATENT OFFICE 2,022,723

EGG TURNING TRAY

Leland G. Knapp, Chicago, Ill., assignor to Montgomery Ward & Co., Incorporated, Chicago, Ill., a corporation of Illinois Application April 3, 1931, Serial No. 527,420

3 Claims. (Cl. 119—44)

The object of the present invention is to provide a novel form of tray for the support of eggs in incubators.

The construction contemplated by the invention is such as to be manufactured at relatively low cost, but afford a durable and practical unit, the parts being so assembled that the eggs may be turned readily during the incubation period in order to subject the same to the proper action of the heat, and thereby to insure a high percentage of yield in the chicks that are hatched.

Other objects will appear as the nature of the improvements is better understood, the invention consisting substantially in the novel construction, combination and arrangement of parts hereinafter fully described, illustrated in the accompanying drawings, and finally pointed out in the appended claims.

In the drawings:

Fig. 1 is a top plan view of an egg tray embodying the present invention;

Fig. 2 is a longitudinal sectional view thereof on the line 2—2, Fig. 1;

Fig. 3 is a transverse sectional view of the same on the line 3—3, Fig. 1;

Fig. 4 is a fragmentary detail perspective view of one corner of the supporting frame of the tray; and Figs. 5 and 6 are detail perspective views of one of the side and one of the end rails of the turning frame.

Egg trays for incubators having means for turning the eggs in order to expose different areas of the eggs to the action of the heat have been in use. These trays, however, generally are of cumbersome construction. The parts thereof are of such character as to materially reduce the egg-holding capacity of the trays, so that the number of eggs accommodated by the trays is limited. Furthermore, the general construction of these trays has been such that the operators have been inconvenienced in the introduction of the eggs to the trays, and proper support of the eggs in the trays has been difficult to maintain.

The present invention provides a tray wherein the eggs lie relatively close together without, however, interfering with proper circulation of the heated air, thus increasing the capacity of the tray in the number of eggs accommodated thereby; at the same time, the present invention also enables proper introduction of the eggs and their support with relation to each other as to permit their ready inspection from time to time during the period of incubation, and also free turning of the eggs as the operator may desire to change the angular position of the eggs to facilitate the action of the heat thereon.

The present tray includes a supporting frame 10 which is made up of a base member 11 and a guide member 12. The supporting frame 10 generally is of rectangular formation, the walls of the base member 11 being thicker than the walls of the guide member 12. This provides a supporting ledge 13 between the base member 11 and the guide member 12. This guide member comprises parallel side rails and transverse end rails extending across the guide member between the ends of said side rails, and forming stops the purpose of which will appear at a later point herein.

Stretched over the base member 11, between the same and the guide member 12, is a supporting screen 14, preferably formed of wire fabric of suitable mesh, the edges of the screen 14 being clamped between the guide member 12 and the base member 11, the ledge 13 serving to support the outer edges of the screen 14. Suitable fastening devices are employed to hold the guide member 12 on the base member 11, and thereby to maintain the screen 14 clamped between these two members, which fastening means may be nails or the like.

Extending transversely of the base member 11 is a series of cross supports 15 to prevent sagging of the screen 14. One of these supports 15 is spaced a sufficient distance from one end of the base member 11, as illustrated in Fig. 2, to provide an opening 16 which affords a passage for the chicks from the upper surface of the screen 14 to the space below the tray. The opening 16 is closed by a door 17, which is formed of wire mesh fabric similar to the screen 14, the door 17 being hingedly connected to one of the cross supports 15, as at 18, so as to be swung upwardly and thereby to uncover the opening 16 to permit passage of the chicks.

Preferably, the base member 11 and the guide member 12 are formed of wood, because of its lightness and ready assembly of the members 11 and 12 with respect to each other.

Mounted for slidable movement on the guide member 12 is a turning frame 19. This frame preferably is formed of metal, which permits the parts thereof readily to be stamped into shape, and also to be easily assembled, and said turning frame includes a pair of side rails 20, and a pair of end rails 21 connecting the extremities of the side rails 20. The construction of the side and end rails 20 and 21 is more clearly illustrated in Figs. 5 and 6. The side rail 20 includes a vertical flange 22 and a horizontal flange 23, the ends of the vertical flanges 22 being cut away so as to afford connecting lips 24 at the ends of the horizontal flanges 23.

The end rails 21 also include vertical flanges 25 and horizontal flanges 26. Each terminal portion of the end rails 25 is split, the ends of the vertical flanges 25 being bent inwardly to form connecting lips 27 that overlap the contiguous end portions of the vertical flanges 22 of the side rails 20. By splitting the end portions of the end rails 25, outwardly extending connecting lips 28 are also formed at the extremities of the horizontal flanges 26, and said connecting lips 28 overlap the connecting lips 24 when the side and end rails are brought into assembled relation. Thus the connecting lips 24, 27 and 28 provide a strong connection for the meeting portions of the side and end rails to prevent separation of the same, and also to maintain the rails in proper angular relation with respect to each other. By dipping the corner joints thus formed into a solder bath the parts are firmly anchored together, or this may be accomplished by spot welding, as is well known in the art of metal working.

The turning frame 20 is of less length than the supporting frame 10, the former snugly fitting into the guide member 12, and being maintained on the supporting frame by the horizontal flanges 23 and 26 resting on the upper edges of the guide member 12. By these flanges the turning frame is suspended in the guide member 12 and slidably supported therefrom for relative movement with respect to the guide member. The difference in length between the supporting and turning frames permits the turning frame to be moved lengthwise of the supporting frame, and thus to give the proper range of movement to shift the eggs to different positions, and thereby vary their angular relation to the screen 14. In such lengthwise movement of the turning frame the ends thereof contact the stops formed by the transverse end rails of the guide member, so that the sliding movement of the turning frame with respect to the guide member is limited, and the turning frame cannot be moved out of the guide member. To hold the eggs properly in the turning tray the latter is provided with a series of transversely extending corrugated supporting bars 29 formed of wire of suitable gauge. The contiguous bars are so arranged that the opposite corrugations thereof occupy reversed positions, and thereby permit an egg to be received and supported in the space between these opposite corrugations, with the point of the eggs resting on the screen 14. The ends of each of the supporting bars 29 are bent at right angles to the bars and in reverse directions with respect to each other, and each of said ends fits into an inwardly-projecting anchoring eye 30 that is punched out of the vertical flanges 20. The ends of the supporting bars 29 are held in the anchoring eyes 30 by solder, or similar fastenings, the solder being conveniently applied by dipping the tray into a bath thereof, or by individual application of the solder to each of the eyes.

By reason of the overlapping connecting lips 27 with the vertical flanges 20, it is necessary to recess the inner faces of the side wall members of the guide member 12, as indicated at 31 in Fig. 4. This recess accommodates the increased thickness of the frame 19 at the points mentioned, so as to permit the vertical flanges 20 to fit snugly against the side walls of the guide member 12 for freedom of movement of the turning frame on said guide member.

In the use of the hereindescribed tray the eggs are positioned in the turning frame with their points downward and resting on the screen 14. By shifting the turning frame 19 with respect to the supporting frame 10 the angular disposition of the eggs is changed from time to time, thus presenting the different surfaces of the eggs to the heat, the turning frame 19 being shifted in opposite directions in order to change the angular position of the eggs as required. After the chicks are hatched, and the door 17 is opened, the chicks may pass down through the opening 16 to the lower portion of the incubator where they remain until removed to the brooder.

Due to the use of the metallic turning frame the capacity of the same is greatly increased as to the number of eggs which it will accommodate, and by reason of the employment of the corrugated supporting bars 29 it is possible to position the eggs closer together, thereby also increasing the capacity of the tray.

I claim:

1. In a tray of the class described, the combination with a supporting frame having side and end members, of an egg support arranged therein, a turning frame mounted in said supporting frame and slidable therein to vary the position of the turning frame with respect to the supporting frame, said turning frame being formed of side and end angle iron members adapted to engage and fit over the side and end members of the supporting frame, the contiguous meeting portions of said side and end members being provided with overlapping lips for connecting and holding said contiguous portions together, and means associated with said turning frame for holding the eggs therein in proper relation to the egg support of the supporting frame.

2. In a tray of the class described, the combination with a supporting frame, of an egg support arranged therein, a turning frame slidably mounted in said supporting frame, said turning frame including side members and end members having vertical and horizontal flanges, the terminal portions of said side and end members having connecting lips formed thereat adapted to overlap said contiguous terminal portions for connecting the latter and maintaining the side and end members in assembled relation, said vertical flanges being adapted to fit closely to the sides of the supporting frame and engage the end members of the supporting frame which act as stops, said horizontal flanges engaging the top of the supporting frame to hold the turning frame suspended in the supporting frame, and means carried by said turning frame for supporting the eggs therein in proper relation to the egg support of the supporting frame.

3. In a tray of the class described, the combination with a rectangular supporting frame including a base member and a guide member, the latter comprising parallel side rails and transverse end rails extending across the guide member between the ends of said side rails and forming stops, of an egg support arranged between said base and guide members, a turning frame arranged within said guide member and provided with outwardly-extending flanges on the sides and one end adapted to be seated on the side rails of the guide member and one end rail in its outermost position, whereby the turning frame is suspended in the guide member and slidably supported for relative movement with respect to the guide member, the ends of said turning frame being adapted to contact the stops formed by the transverse end rails of the guide member for limiting the sliding movement of the turning frame with respect to the guide member and preventing the turning frame being moved out of the guide member, and a series of egg supporting members extending across said turning frame for holding the eggs therein in proper relation to the egg support of the supporting frame.

LELAND G. KNAPP.